(12) United States Patent
Woo et al.

(10) Patent No.: US 12,435,550 B2
(45) Date of Patent: Oct. 7, 2025

(54) RAIL LOCKING DEVICE

(71) Applicants: HYUNDAI MOTOR COMPANY, Seoul (KR); KIA CORPORATION, Seoul (KR); HYUNDAI TRANSYS INC., Seosan-si (KR)

(72) Inventors: Jung Hoon Woo, Suwon-si (KR); Dae Hee Lee, Incheon (KR); Hong Sik Chang, Hwaseong-si (KR); Jin Suk Seo, Seoul (KR); Hye Kyung Kim, Suwon-si (KR); Kwan Woo Lee, Suwon-si (KR); Jin Wook Choi, Hwaseong-si (KR); Eom Seok Yoo, Hwaseong-si (KR); In Gul Baek, Hwaseong-si (KR); Ki Young Yun, Yongin-si (KR); Yong Seong Jang, Incheon (KR); Chan Ju Kim, Gunpo-si (KR)

(73) Assignees: HYUNDAI MOTOR COMPANY, Seoul (KR); KIA CORPORATION, Seoul (KR); HYUNDAI TRANSYS INC., Seosan-si (KR)

( * ) Notice: Subject to any disclaimer, the term of this patent is extended or adjusted under 35 U.S.C. 154(b) by 0 days.

(21) Appl. No.: 18/509,918

(22) Filed: Nov. 15, 2023

(65) Prior Publication Data
US 2024/0392614 A1 Nov. 28, 2024

(30) Foreign Application Priority Data
May 23, 2023 (KR) ........................ 10-2023-0066374

(51) Int. Cl.
E05B 83/32 (2014.01)

(52) U.S. Cl.
CPC .................................. E05B 83/32 (2013.01)

(58) Field of Classification Search
CPC .................................. E05B 83/32; B60R 7/04
See application file for complete search history.

(56) References Cited

U.S. PATENT DOCUMENTS

| 4,834,425 | A | * | 5/1989 | Kawai | ..................... B60R 22/06 |
| | | | | | 280/806 |
| 7,401,831 | B2 | * | 7/2008 | Sturt | ........................ B60N 3/12 |
| | | | | | 224/539 |
| 7,591,498 | B2 | * | 9/2009 | Busha | .................... B60N 3/101 |
| | | | | | 224/281 |

FOREIGN PATENT DOCUMENTS

KR 20180042632 A 4/2018

\* cited by examiner

*Primary Examiner* — Jake Cook
(74) *Attorney, Agent, or Firm* — Lempia Summerfield Katz LLC

(57) ABSTRACT

Disclosed is a rail locking device in a rail structure having a mounting area provided in a first rail or a second rail. The first and second rails are coupled to each other and the first rail may slide along the second rail. In particular, the rail locking device includes a moving cover portion mounted in the mounting area, and a locking portion having wound therein the moving cover portion extending from the mounting area and configured to selectively limit extraction of the moving cover portion to temporarily fix the first rail that slides forwards or rearwards of the second rail in place.

9 Claims, 7 Drawing Sheets

RAIL LOCKING DEVICE

CROSS-REFERENCE TO RELATED APPLICATION

This application claims, under 35 U.S.C. § 119 (a), the benefit of and priority to Korean Patent Application No. 10-2023-0066374, filed on May 23, 2023, the entire contents of which are incorporated herein by reference.

BACKGROUND

(a) Technical Field

The present disclosure relates to a rail locking device, and more particularly to a rail locking device capable of, when a strong momentary force is applied to a structure that is mounted to a sliding rail and configured to slide therealong, preventing forward or rearward movement of the structure.

(b) Background Art

Generally, a vehicle console is a structure installed in a space between a driver's seat and a passenger seat in a vehicle interior, and is used as a storage place for storing items used by a driver and passengers.

In addition to storing items, the vehicle console is also designed for providing a resting place for a driver's arm, helping to alleviate or reduce driver's fatigue caused by extended periods of driving.

A conventional vehicle console has a shape of a box with an openable top and includes a console main body coupled to a floor surface between a driver's seat and a passenger seat, and a cover member hinged to one side of the top of the console main body to cover the open top thereof.

Here, the console main body has the shape of a box with an openable top to have a storage space to store items.

Further, the cover member is hinged to one side of the top of the console main body and serves to open and close the open top of the console main body. The cover member also serves as an armrest allowing the driver to comfortably rest his arm thereon after placing it over the top of the console main body.

However, the conventional vehicle console as described above has a problem in that it is quite inconvenient for an occupant seated in a rear seat to use the console because its position is completely fixed to the driver's seat and passenger seat. In addition, there is no space between the driver's seat and the front passenger seat, so it is cumbersome when the occupant moves.

In order to solve such problems, a vehicle console that is slidable by being rail-coupled to a space between a driver's seat and a passenger seat has been developed. However, when a strong force is momentarily applied, in other words, when a vehicle suddenly starts or stops, the vehicle console moves forwards or rearwards accordingly, colliding with an occupant and causing injury.

The above information disclosed in this Background section is provided only to aid in understanding the background of the present disclosure, and therefore it may contain information that does not form the prior art that is already known to a person of ordinary skill in the art.

SUMMARY

The present disclosure provides a rail locking device capable of, when a strong force is momentarily applied forwards or rearwards to a structure that is mounted to a sliding rail and configured to slide forwards or rearwards, preventing forward or rearward movement of the structure by achieving selective locking while allowing a cover connected to the sliding rail to be pulled forwards or rearwards.

In one aspect of the present disclosure, a rail locking device in a rail structure having a mounting area provided in one of two rails, a first rail, and a second rail. The first and second rails are coupled to each other and the first rail is configured to slide along the second rail. In one embodiment, the rail locking device includes a moving cover portion mounted in the mounting area, and a locking portion having wound therein the moving cover portion extending from the mounting area and configured to selectively limit extraction of the moving cover portion to temporarily fix the first rail that slides forwards or rearwards of the second rail in place.

In an embodiment, the moving cover portion may include a mounting member fastened and mounted to the mounting area, the mounting area provided in a pair and disposed at the front and the rear of the first rail, respectively, and a draw-out member extending from the mounting area and being wound inside the locking portion.

In another embodiment, the locking portion may include a main body having wound therein the moving cover portion, a first latch mounted inside the main body and configured to rotate as the moving cover portion is drawn out and having an outer circumferential surface provided with gear teeth. The locking portion may further include a second latch having a locking piece protruding therefrom, and the locking piece is configured to be selectively tooth-coupled with the gear teeth and rotatable about a rotation axis. The locking portion may further includes a torsion spring mounted inside the main body and configured to elastically support the second latch so that the second latch maintains its initial position.

In still another embodiment, the initial position may be set as a position where the locking piece is released from the gear teeth.

In yet another embodiment, the second latch may include a lifting guide configured to be selectively lifted by the moving cover portion, and a coupling guide, coupled to the torsion spring and configured to rotate about the rotation axis as the lifting guide is lifted so as to guide the locking piece to be tooth-coupled to the gear teeth.

In still yet another embodiment, the second latch may maintain the initial position when the elastic restoring force acting on the coupling guide by the torsion spring is greater than the force with which the moving cover portion is drawn out.

In a further embodiment, when the momentary force with which the moving cover portion is drawn out is greater than the elastic restoring force acting on the coupling guide by the torsion spring, the second latch may rotate so that the locking piece is engaged with the gear teeth.

In another further embodiment, the main body may include a draw-out guide configured to guide lifting of the lifting guide while the moving cover portion is drawn out.

In still another further embodiment, the locking portion may be provided in pairs, each of the pairs being mounted at the front and the rear of the second rail, respectively, and the locking portion may be configured to selectively limit extraction of the moving cover portion at the rear when a forward impact occurs and to selectively limit extraction of the moving cover portion at the front when a rearward impact occurs.

Other aspects and embodiments of the present disclosure are discussed infra.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the present disclosure are discussed below in detail.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein.

Figure 1:
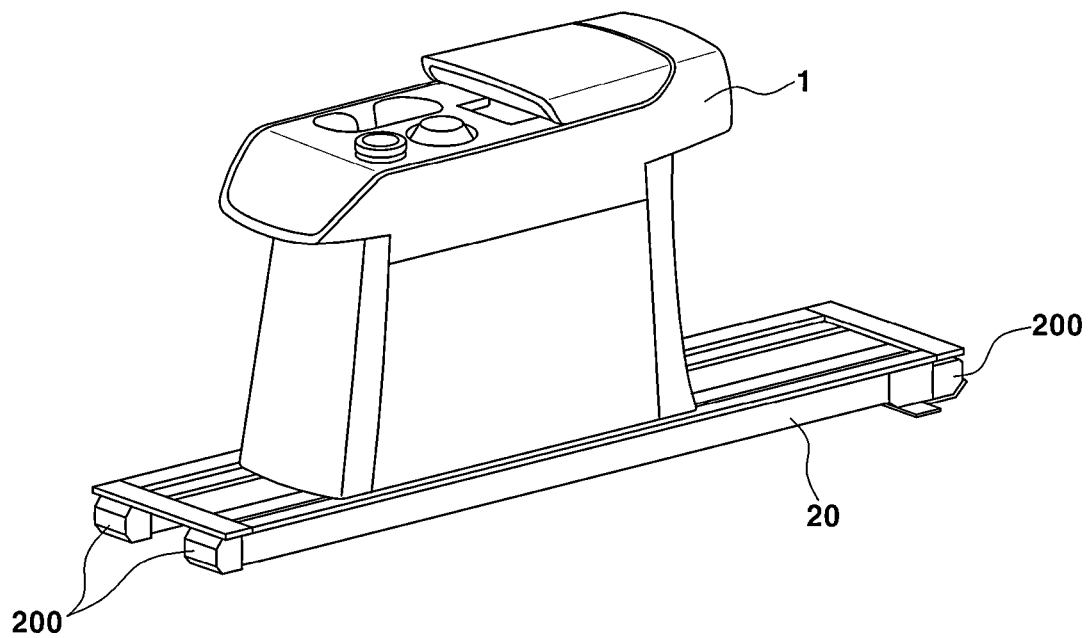
FIG. 1 is a view illustrating a mounting state of a rail locking device according to an embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, should be determined in part by the particular intended application and usage environment.

In the figures, reference numbers refer to the same or equivalent parts of the present disclosure throughout the several figures of the drawing.

DETAILED DESCRIPTION

Description is now given in detail according to embodiments disclosed herein, with reference to the accompanying drawings.

Advantages and features of the present disclosure, and a method of achieving the same, should be apparent with reference to the embodiments described below in detail in conjunction with the accompanying drawings.

When a component, device, element, or the like of the present disclosure is described as having a purpose or performing an operation, function, or the like, the component, device, or element should be considered herein as being "configured to" meet that purpose or to perform that operation or function.

However, the present disclosure may be embodied in many different forms, and should not be construed as being limited to the embodiments set forth herein. Rather, the embodiments are provided so that the present disclosure should be thorough and complete, and should fully convey the scope of the present disclosure to those having ordinary skill in the art.

In describing the present disclosure, if a detailed explanation of a related known function or construction is considered to unnecessarily obscure the gist of the present disclosure, such explanation has been omitted but would be understood by those having ordinary skill in the art.

Figure 2:
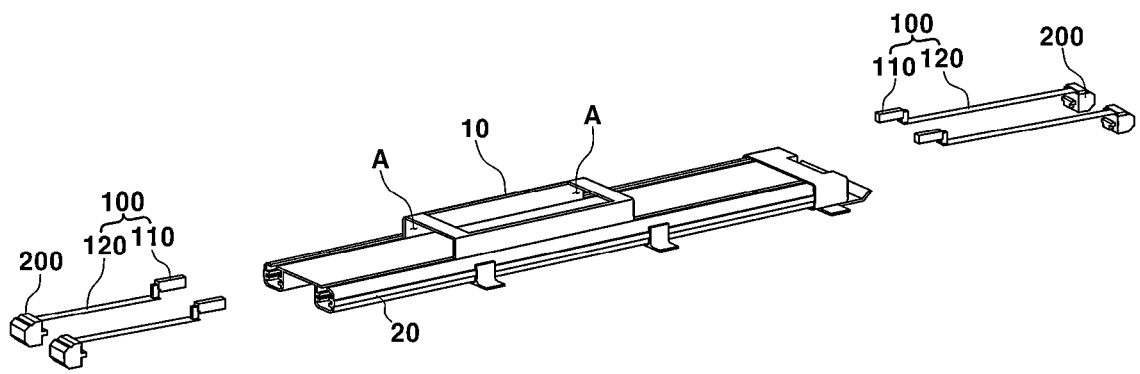
FIG. 2 is an exploded view illustrating a rail locking device according to an embodiment of the present disclosure.
Figure 3:
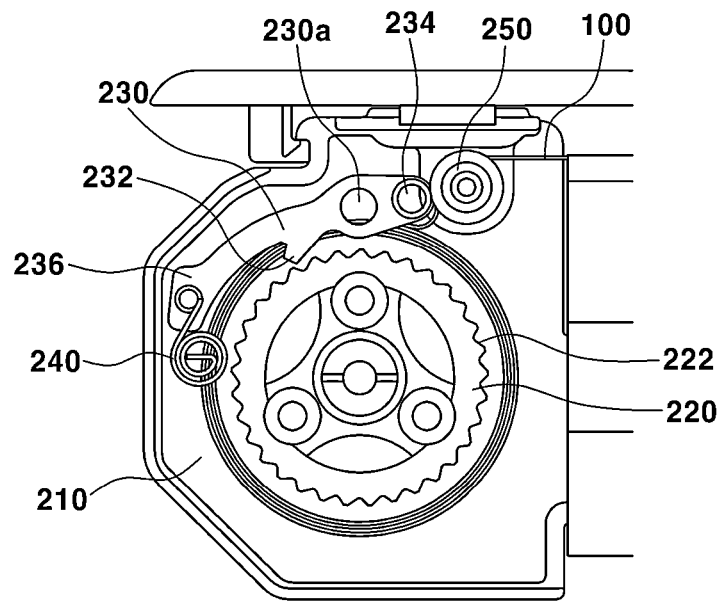
FIG. 3 is a view illustrating a locking portion for a rail locking device according to an embodiment of the present disclosure.

FIG. 1 is a view illustrating a mounting state of a rail locking device according to an embodiment of the present disclosure, FIG. 2 is a view illustrating an exploded state of a rail locking device according to an embodiment of the present disclosure, and FIG. 3 is a view illustrating a locking portion for a rail locking device according to an embodiment of the present disclosure.

Figure 4:
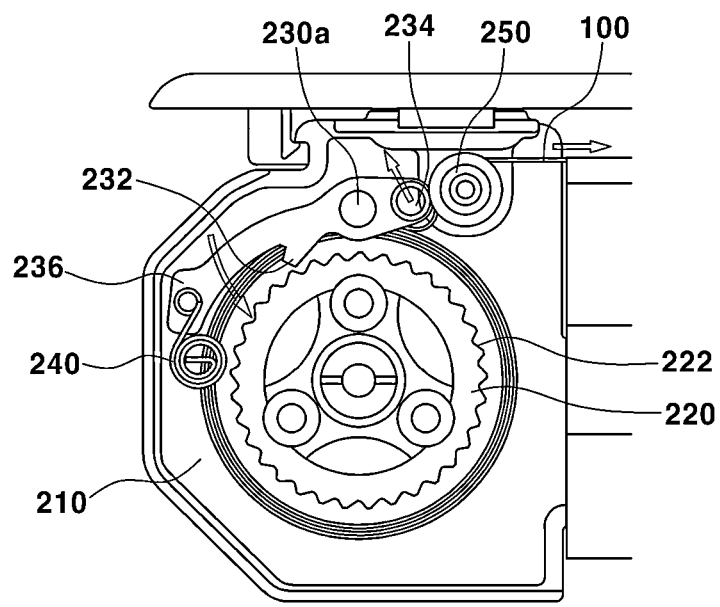
FIGS. 4 and 5 are views illustrating an operating state of a locking portion for a rail locking device according to an embodiment of the present disclosure when locking is achieved.
Figure 5:
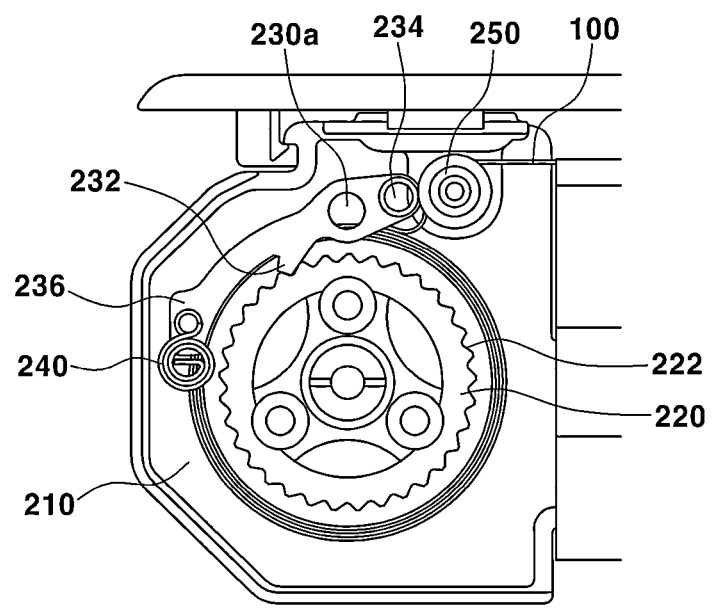
Figure 6:
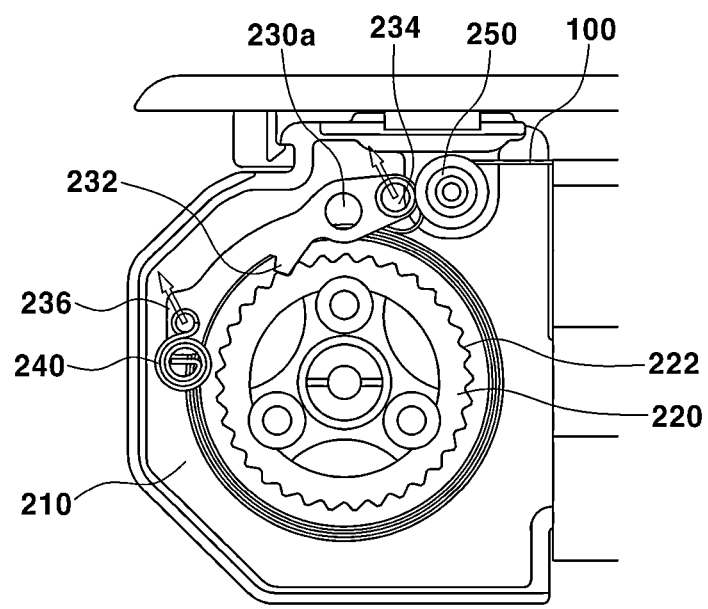
FIGS. 6 and 7 are views illustrating an operating state of a locking portion for a rail locking device according to an embodiment of the present disclosure when locking is released.
Figure 7:
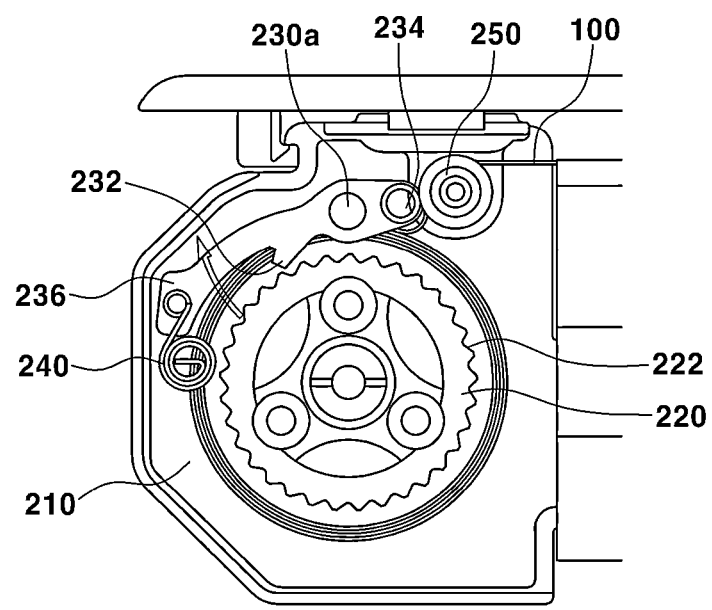
Figure 8:
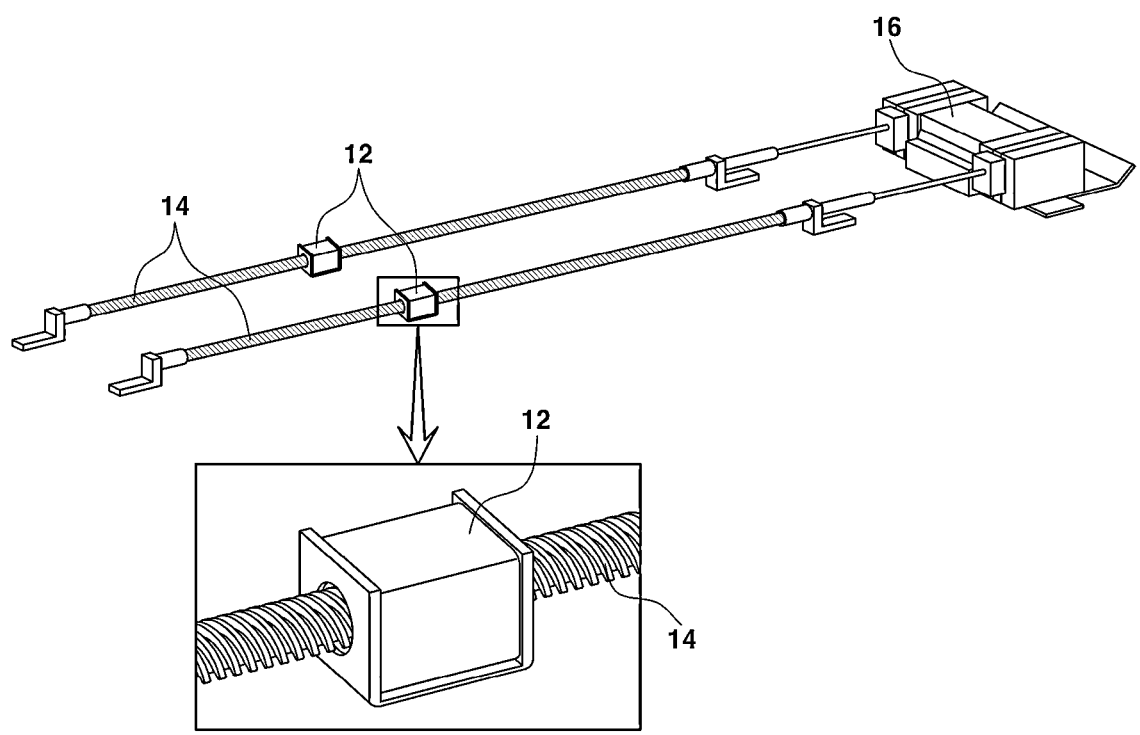
FIG. 8 is a view illustrating sliding movement of a first rail for a rail locking device according to an embodiment of the present disclosure.

FIGS. 4 and 5 are views illustrating an operating state of a locking portion for a rail locking device according to an embodiment of the present disclosure when locking is achieved, FIGS. 6 and 7 are views illustrating an operating state of a locking portion for a rail locking device according to an embodiment of the present disclosure when locking is released, and FIG. 8 is a view illustrating sliding movement of a first rail for a rail locking device according to an embodiment of the present disclosure.

Conventionally, in constructing rails that are coupled to each other and one of them configured to slide, the rail may be slid using both manual and electric methods.

In such a rail structure, locking is achieved using a separate locking module in a manual operation, and in an electric operation, self-locking is achieved by making the friction angle of a lead nut greater than the lead angle of a lead screw.

However, considering the structure and layout, generally, a locking module and a locking structure, configured to adjust a lead angle and a friction angle, cannot be universally adopted in one rail structure. The present disclosure is to provide a locking structure that facilitates sliding movement in both forward and rearward directions, using both manual and electric methods. Furthermore, it prevents the forward or rearward movement resulting from impacts, such as sudden stops or starts of a vehicle, in situations of this nature.

As illustrated in FIG. 1, a rail locking device according to one embodiment may be adopted in, for example, a rail structure configured to allow a vehicle center console 1 to slide therealong. In particular, the rail locking device includes a moving cover portion 100 and a locking portion 200, as illustrated in FIG. 2.

Here, in this embodiment, although it is described that the rail locking device is adopted in the rail structure configured to allow the vehicle center console 1 to slide therealong, it merely corresponds to one embodiment but not limited thereto. The rail locking device may be adopted in a storage structure mounted inside a vehicle and may also be adopted in furniture in addition to vehicles.

As illustrated in FIG. 2, the moving cover portion 100 is mounted in a mounting area A in a rail structure in which the mounting area A is provided in one of two rails, i.e., a first rail 10 and a second rail 20. The first and second rails 10, 20 are coupled to each other and the first rail 10 is configured to slide along the second rail 20.

The moving cover portion 100 may include a mounting member 110 and a draw-out member 120.

The mounting member 110 is provided in a pair and fastened or mounted to the mounting area A. The pair of mounting members 110 are disposed at the front and rear of the first rail 10, respectively.

Further, the draw-out member 120 extends from the mounting member 110 and is wound inside the locking portion 200.

The moving cover portion 100 is mounted in the mounting area A of the first rail 10, i.e., an upper rail, configured to slide along the second rail 20, i.e., a fixed lower rail, using the mounting member 110. In the state in which the center console 1 is mounted to the first rail 10, the length of the draw-out member 120 drawn out from the locking portion 200 may be adjusted while the center console 1 slides in the lengthwise direction of the second rail 20 manually or electrically.

As illustrated in FIG. 8, the first rail 10 has mounted thereto a driving portion 12, which has formed therein a lead nut (not shown). Here, the lead nut is engaged with a lead screw 14, extending in the lengthwise direction of the second rail 20, inside the driving portion 12. With this configuration, when the lead screw 14 rotates in a forward or reverse direction as a driving motor 16 is driven, the driving portion 12 slides, allowing the first rail 10 to slide forwards or rearwards of the second rail 20.

Here, because the lead angle of the lead screw 14 is formed larger than the friction angle of the lead nut and thus the usual self-locking as described above does not apply, the center console 1 may be manually slid forwards or rearwards of the second rail 20 when the driving motor 16 is not driven (see FIG. 1).

However, in the rail structure in which self-locking does not apply, an impact occurs towards the front of the vehicle when the vehicle suddenly stops, whereby the center console 1 may move forwards and collide with a passenger, resulting in injury to the passenger.

Conversely, when the vehicle suddenly starts, an impact occurs towards the rear of the vehicle and the center console 1 moves rearwards, colliding with a passenger and causing an injury.

For this reason, the locking portion 200 selectively limits the extraction of the draw-out member 120 mounted in the mounting area A, thereby temporarily fixing the first rail 10, which slides forwards or rearwards of the second rail 20, in place.

In one embodiment, the locking portion 200 is provided in pairs and each of the pairs is mounted at the front and rear of the second rail 20, respectively. The locking portion 200 selectively limits the extraction of the moving cover portion 100 at the rear when a forward impact occurs, and selectively limits the extraction of the moving cover portion 100 at the front when a rearward impact occurs.

The locking portion 200 includes, as illustrated in FIG. 3, a main body 210, a first latch 220, a second latch 230, and a torsion spring 240.

The locking portion 200 includes the main body 210, the first latch 220, the second latch 230, and the torsion spring 240.

The main body 210 has a predetermined internal space, and the draw-out member 120 of the moving cover portion 100 extending from the mounting area A is wound around the first latch 220 in the internal space.

The first latch 220 is mounted inside the main body 210 and configured to rotate as the draw-out member 120 is drawn out. The first latch 220 has an outer circumferential surface provided with gear teeth 222.

The second latch 230 has a locking piece 232 protruding therefrom, and the locking piece 232 is configured to be selectively tooth-coupled with the gear teeth 222 at the upper portion of the first latch 220. The second latch 230 is rotatable about a rotation axis 230a.

The second latch 230 may include a lifting guide 234 and a coupling guide 236.

The lifting guide 234 is selectively lifted as the draw-out member 120 of the moving cover portion 100 is momentarily drawn out, e.g., pulled with a strong force.

Further, the coupling guide 236 is coupled to the torsion spring 240 and configured to guide the locking piece 232 to be tooth-coupled with the gear teeth 222 by rotating about the rotation axis 230a as the lifting guide 234 is selectively lifted.

Moreover, the torsion spring 240 is mounted inside the main body 210 and is configured to elastically support the second latch 230 so that the second latch 230 maintains its initial position.

Here, the initial position may be set as a position where the locking piece 232 is released from the gear teeth 222, i.e., the position of the second latch 230 shown in FIG. 3.

The initial position may be maintained when the elastic restoring force of the second latch 230 acting on the coupling guide 236 by the torsion spring 240 is greater than the force with which the moving cover portion 100 is drawn out, i.e., unless the draw-out member 120 is momentarily strongly drawn out (pulled).

Conversely, when the momentary force with which the moving cover portion 100 is drawn out is greater than the elastic restoring force of the second latch 230 acting on the coupling guide 236 by the torsion spring 240, more specifically, when the momentary strong pulling force is greater than the elastic restoring force, the second latch 230 rotates so that the locking piece 232 is engaged with the gear teeth 222 and is temporarily locked, thereby preventing the moving cover portion 100 from being drawn out.

Based on the above configuration, a state in which the operation of the rail locking device according to the present embodiment is applied in the center console 1 is described as an example.

Sudden Start of Vehicle

When a vehicle suddenly starts, the first rail 10 and the center console 1 coupled to the first rail 10 move rearwards on the second rail 20, generating an impact.

Due to the impact, the center console 1 may momentarily strongly slide towards the rear of the second rail 20. Here, the locking portion 200 mounted at the front of the second rail 20 temporarily limit the extraction of the moving cover portion 100 mounted at the front of the first rail 10 and fix the moving cover portion 100 in place.

In other words, as illustrated in FIG. 4, when the moving cover portion 100 mounted at the front of the second rail 20 is momentarily pulled by a strong force momentarily acting rearwards due to the sudden start of the vehicle from the initial position, the draw-out member 120 is pulled along a draw-out guide 250 provided in the main body 210 and the lifting guide 234 is lifted.

Here, the draw-out guide 250 is configured to guide lifting of the lifting guide 234 while the moving cover portion 100 is drawn out. The draw-out guide 250 allows the draw-out member 120, which is drawn out while supporting the lower portion of the lifting guide 234, to be alternately wound inside the main body 210, so that when the draw-out member 120 is momentarily pulled with a strong force, the lifting guide 234 may be selectively lifted by the lower portion thereof being lifted up with the strong pulling force.

Meanwhile, as described above, when the lifting guide 234 is lifted, the second latch 230 rotates about the rotation axis 230a, and the rotating force acts greater than the elastic restoring force of the torsion spring 240 acting on the coupling guide 236, as illustrated in FIG. 5, so that the locking piece 232 is positioned to be engaged with gear teeth 222.

Accordingly, extraction of the draw-out member 120 from the front of the first rail 10 is temporarily limited owing to the gear locking as described above, and thus the first rail 10, supposed to be slid to the rear of the second rail 20, is temporarily fixed in place, thereby preventing a problem in which the center console 1 moves rearwards and collides with a passenger due to the impact at the time of sudden start.

As such, because limiting the sliding movement of the first rail 10 towards the rear of the second rail 20 upon sudden start is temporary, when the momentary pulling force ceases to act, the elastic restoring force acting on the coupling guide 236 by the torsion spring 240 becomes greater than the force with which the draw-out member 120 is drawn out, as illustrated in FIG. 6, and the coupling guide 236 rotates about the rotation axis 230a to lower the lifting guide 234 to return to the initial position so that the locking piece 232 is released from the gear teeth 222, as illustrated in FIG. 7.

Here, when the locking piece 232 is released, i.e., when the second latch 230 returns to the initial position, the center console 1 coupled to the first rail 10 may slide forwards or rearwards using a manual or electric method.

Sudden Stop of Vehicle

When a vehicle suddenly stops, the first rail 10 and the center console 1 coupled to the first rail 10 move forwards on the second rail 20, generating an impact.

Due to the impact, the center console 1 may momentarily strongly slide towards the front of the second rail 20. Here, the locking portion 200 mounted at the rear of the second rail 20 temporarily limit the extraction of the moving cover portion 100 mounted at the rear of the first rail 10 and fix the moving cover portion 100 in place.

In other words, as illustrated in FIG. 4, when the moving cover portion 100 mounted at the rear of the second rail 20 is momentarily pulled by a strong force momentarily acting forwards due to the sudden stop of the vehicle from the initial position, the draw-out member 120 is pulled along the draw-out guide 250 provided in the main body 210 and the lifting guide 234 is lifted.

As described above, when the lifting guide 234 is lifted, the second latch 230 rotates about the rotation axis 230a, and the rotating force acts greater than the elastic restoring force of the torsion spring 240 acting on the coupling guide 236, as illustrated in FIG. 5, so that the locking piece 232 is positioned to be engaged with the gear teeth 222.

Accordingly, extraction of the draw-out member 120 from the rear of the first rail 10 is temporarily limited owing to the gear locking as described above. Thus, the first rail 10, which is supposed to be slid to the front of the second rail 20, is temporarily fixed in place, thereby preventing a problem in which the center console 1 moves forwards to collide with a passenger due to the impact at the time of sudden stop.

As such, because limiting the sliding movement of the first rail 10 towards the front of the second rail 20 upon sudden stop is temporary, when the momentary pulling force ceases to act, the elastic restoring force acting on the coupling guide 236 by the torsion spring 240 becomes greater than the force with which the draw-out member 120 is drawn out, as illustrated in FIG. 6, and the coupling guide 236 rotates about the rotation axis 230a to lower the lifting guide 234 to return to the initial position so that the locking piece 232 is released from the gear teeth 222, as illustrated in FIG. 7.

Here, when the locking piece 232 is released, i.e., when the second latch 230 returns to the initial position, the center console 1 coupled to the first rail 10 may slide forwards or rearwards using a manual or electric method.

As is apparent from the above description, the present disclosure provides the following effects.

According to the present disclosure, when a strong force is momentarily applied forwards or rearwards to a structure that is mounted to a sliding rail and configured to slide forwards or rearwards, a cover connected to the sliding rail is pulled forwards or rearwards to achieve selective locking, thereby preventing forward or rearward movement of the structure.

Further, according to the present disclosure, a sliding rail structure that may slide manually and electrically in forward and rearward directions is adopted, but the structure may be temporarily fixed when an impact is generated by sudden stop or sudden start of a vehicle, thereby preventing injury to occupants colliding with the structure.

In the above, embodiments of the present disclosure have been described with reference to the accompanying drawings. However, those having ordinary skill in the art to which the present disclosure pertains should understand that various modifications may be made therefrom, and that all or part of the above-described embodiment(s) may be selectively combined. Therefore, the true technical protection scope of the present disclosure should be determined by the technical ideas of the appended claims.

What is claimed is:

1. A rail locking device in a rail structure having a mounting area provided in one of two rails, a first rail and a second rail being coupled to each other and the first rail being configured to slide along the second rail, the rail locking device comprising:
   a moving cover portion mounted in the mounting area and configured to extend from the mounting area; and
   a locking portion configured to selectively limit extraction of the moving cover portion to temporarily fix the first rail that slides forwards or rearwards of the second rail in place,
   wherein the locking portion is further configured to:
      selectively limit the extraction of the moving cover portion at a rear of the second rail based on an occurrence of a forward impact, and
      selectively limit the extraction of the moving cover portion at a front of the second rail based on an occurrence of a rearward impact.

2. The rail locking device of claim 1, wherein the moving cover portion comprises:
   a mounting member mounted to the mounting area, the mounting area provided in a pair and disposed at a front and a rear of the first rail, respectively; and
   a draw-out member extending from the mounting area and being wound inside the locking portion.

3. The rail locking device of claim 1, wherein the locking portion comprises:
   a main body in which the moving cover portion is wound;

a first latch mounted inside the main body and configured to rotate as the moving cover portion is drawn out, the first latch including an outer circumferential surface provided with gear teeth;

a second latch, having a locking piece protruding from the second latch, the locking piece being configured to be selectively tooth-coupled with the gear teeth, and rotatable about a rotation axis; and a torsion spring, mounted inside the main body and configured to elastically support the second latch so that the second latch maintains an initial position of the second latch.

4. The rail locking device of claim 3, wherein the initial position is set as a position where the locking piece is released from the gear teeth.

5. The rail locking device of claim 3, wherein the second latch comprises:

a lifting guide configured to be selectively lifted by the moving cover portion; and a coupling guide, coupled to the torsion spring and configured to rotate about the rotation axis as the lifting guide is lifted so as to guide the locking piece to be tooth-coupled to the gear teeth.

6. The rail locking device of claim 5, wherein the second latch is configured to maintain the initial position when an elastic restoring force acting on the coupling guide by the torsion spring is greater than a force with which the moving cover portion is drawn out.

7. The rail locking device of claim 5, wherein, when a momentary force with which the moving cover portion is drawn out is greater than an elastic restoring force acting on the coupling guide by the torsion spring, the second latch is configured to rotate so that the locking piece is engaged with the gear teeth.

8. The rail locking device of claim 5, wherein the main body comprises a draw-out guide configured to guide lifting of the lifting guide and draw out the moving cover portion.

9. The rail locking device of claim 1, wherein the locking portion is provided in pairs, each of the pairs being mounted at the front and the rear of the second rail, respectively.

* * * * *